US008429754B2

(12) United States Patent  (10) Patent No.: US 8,429,754 B2
Jung et al.  (45) Date of Patent: Apr. 23, 2013

(54) CONTROL TECHNIQUE FOR OBJECT PRODUCTION RIGHTS

(75) Inventors: Edward K. Y. Jung, Bellevue, WA (US); Royce A. Levien, Lexington, MA (US); Robert W. Lord, Seattle, WA (US); Mark A. Malamud, Seattle, WA (US); John D. Rinaldo, Jr., Bellevue, WA (US); Clarence T. Tegreene, Bellevue, WA (US); Lowell L. Wood, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1176 days.

(21) Appl. No.: 12/005,162

(22) Filed: Dec. 21, 2007

(65) Prior Publication Data

US 2009/0165147 A1 Jun. 25, 2009

(51) Int. Cl.
*H04L 29/06* (2006.01)
(52) U.S. Cl.
USPC .................................. 726/29; 726/21; 726/31
(58) Field of Classification Search .................... 729/29, 729/21; 713/156, 175; 380/282; 705/59; 700/204; 726/21, 29, 31
See application file for complete search history.

(56) References Cited

U.S. PATENT DOCUMENTS

| 5,204,055 | A | * | 4/1993 | Sachs et al. ........................ 419/2 |
| 5,762,125 | A | * | 6/1998 | Mastrorio ....................... 164/4.1 |
| 5,892,900 | A | | 4/1999 | Ginter et al. |
| 6,170,060 | B1 | | 1/2001 | Mott et al. |
| 6,207,876 | B1 | | 3/2001 | Kellems et al. |
| 6,438,457 | B1 | | 8/2002 | Yokoo et al. |
| 6,458,595 | B1 | | 10/2002 | Selinfreund |
| 6,499,026 | B1 | | 12/2002 | Smith et al. |
| 6,539,283 | B2 | | 3/2003 | Takagi |
| 6,560,511 | B1 | | 5/2003 | Yokoo et al. |
| 6,584,376 | B1 | | 6/2003 | Van Kommer |
| 6,637,013 | B1 | | 10/2003 | Li |
| 6,801,822 | B1 | | 10/2004 | Fujiwara et al. |
| 6,859,782 | B2 | | 2/2005 | Harshaw |
| 6,973,576 | B2 | * | 12/2005 | Giobbi ........................... 713/193 |
| 6,976,163 | B1 | | 12/2005 | Hind et al. |
| 7,013,190 | B2 | | 3/2006 | Fujieda |
| 7,017,043 | B1 | * | 3/2006 | Potkonjak ...................... 713/176 |
| 7,082,399 | B2 | | 7/2006 | Utsumi |
| 7,099,742 | B2 | | 8/2006 | Tajima et al. |
| 7,111,258 | B2 | * | 9/2006 | Kato et al. ..................... 716/102 |
| 7,111,321 | B1 | | 9/2006 | Watts, Jr. et al. |
| 7,120,932 | B2 | | 10/2006 | Lockhart et al. |
| 7,203,966 | B2 | * | 4/2007 | Abburi et al. .................... 726/29 |
| 7,209,900 | B2 | * | 4/2007 | Hunter et al. ................... 705/58 |
| 7,212,574 | B2 | * | 5/2007 | Abrams et al. ........... 375/240.25 |
| 7,213,157 | B2 | | 5/2007 | Dariel |

(Continued)

OTHER PUBLICATIONS

U.S. Appl. No. 12/012,504, Jung et al.

(Continued)

*Primary Examiner* — David Garcia Cervetti
(74) *Attorney, Agent, or Firm* — Suiter Swantz pc llo (57) ABSTRACT

Methods for a control technique for object production rights include but are not limited to receiving at the duplication control system a digital rights management code, the digital rights management code associated with one or more object data files; generating an authorization status based on the digital rights management code; and configuring one or more manufacturing machines to operate as a function of the authorization status.

57 Claims, 6 Drawing Sheets

U.S. PATENT DOCUMENTS

| | | | |
|---|---|---|---|
| 7,296,015 | B2 | 11/2007 | Poltorak |
| 7,337,218 | B2 | 2/2008 | Arnold |
| 7,341,410 | B2 * | 3/2008 | Hill et al. ................. 409/234 |
| 7,349,758 | B2 | 3/2008 | Miro et al. |
| 7,430,762 | B2 * | 9/2008 | Klinefelter et al. ............. 726/30 |
| 7,474,932 | B2 | 1/2009 | Geng |
| 7,493,596 | B2 | 2/2009 | Atkin et al. |
| 7,793,353 | B2 * | 9/2010 | Klinefelter et al. ............. 726/30 |
| 7,831,517 | B1 | 11/2010 | Vijay et al. |
| 7,904,187 | B2 | 3/2011 | Hoffberg et al. |
| 7,941,845 | B2 * | 5/2011 | Brunet et al. ................ 726/18 |
| 7,957,824 | B2 * | 6/2011 | Boronvinskih et al. ......... 700/95 |
| 8,065,741 | B1 * | 11/2011 | Coblentz et al. ................ 726/27 |
| 2002/0035450 | A1 * | 3/2002 | Thackston ........................ 703/1 |
| 2002/0064759 | A1 * | 5/2002 | Durbin et al. ................. 433/213 |
| 2002/0072821 | A1 * | 6/2002 | Baker ............................ 700/98 |
| 2002/0076682 | A1 | 6/2002 | Herman et al. |
| 2002/0099473 | A1 * | 7/2002 | Amadeo et al. ............... 700/251 |
| 2002/0199123 | A1 | 12/2002 | McIntyre et al. |
| 2003/0023337 | A1 | 1/2003 | Godfrey et al. |
| 2003/0036945 | A1 | 2/2003 | Del Vecchio et al. |
| 2003/0069658 | A1 | 4/2003 | Yamazaki |
| 2003/0095665 | A1 * | 5/2003 | Wheeler et al. ............... 380/282 |
| 2003/0176939 | A1 | 9/2003 | Yoshida et al. |
| 2003/0216826 | A1 * | 11/2003 | Klinefelter et al. ............. 700/95 |
| 2003/0217275 | A1 * | 11/2003 | Bentley et al. ................ 713/184 |
| 2003/0224823 | A1 | 12/2003 | Hurst et al. |
| 2003/0226030 | A1 | 12/2003 | Hurst et al. |
| 2004/0030901 | A1 * | 2/2004 | Wheeler et al. ............... 713/176 |
| 2004/0044901 | A1 | 3/2004 | Serkowski et al. |
| 2004/0054907 | A1 | 3/2004 | Chateau et al. |
| 2004/0084520 | A1 * | 5/2004 | Muehl et al. .................. 235/376 |
| 2004/0088674 | A1 * | 5/2004 | Kato et al. ...................... 716/18 |
| 2004/0093516 | A1 * | 5/2004 | Hornbeek et al. ............. 713/201 |
| 2004/0236876 | A1 | 11/2004 | Kondratiev et al. |
| 2005/0080799 | A1 | 4/2005 | Harnden et al. |
| 2005/0097332 | A1 * | 5/2005 | Imai ............................. 713/176 |
| 2005/0239445 | A1 | 10/2005 | Karaoguz et al. |
| 2005/0259072 | A1 | 11/2005 | Sato |
| 2006/0026672 | A1 | 2/2006 | Braun |
| 2006/0036570 | A1 | 2/2006 | Schaefer et al. |
| 2006/0050634 | A1 | 3/2006 | Gous |
| 2006/0053478 | A1 | 3/2006 | Horman et al. |
| 2006/0141107 | A1 | 6/2006 | Schwimmer et al. |
| 2006/0174346 | A1 | 8/2006 | Carroll et al. |
| 2006/0259177 | A1 | 11/2006 | Toyoshima et al. |
| 2007/0006324 | A1 * | 1/2007 | Osada et al. .................... 726/27 |
| 2007/0073433 | A1 * | 3/2007 | Froeschner et al. ........... 700/119 |
| 2007/0143601 | A1 | 6/2007 | Arroyo et al. |
| 2007/0165508 | A1 * | 7/2007 | Kobayashi et al. ........ 369/59.11 |
| 2007/0171801 | A1 * | 7/2007 | Kobayashi et al. ........ 369/59.11 |
| 2007/0185815 | A1 | 8/2007 | Boccon-Gibod et al. |
| 2007/0191982 | A1 | 8/2007 | Sullivan |
| 2007/0211597 | A1 * | 9/2007 | Kobayashi et al. ........ 369/59.23 |
| 2007/0218426 | A1 * | 9/2007 | Quadling et al. ............. 433/223 |
| 2007/0250448 | A1 | 10/2007 | Burkhart et al. |
| 2007/0282480 | A1 | 12/2007 | Pannese et al. |
| 2008/0008348 | A1 | 1/2008 | Metois et al. |
| 2008/0047006 | A1 | 2/2008 | Jeong et al. |
| 2008/0086777 | A1 | 4/2008 | Sanchez |
| 2008/0091300 | A1 | 4/2008 | Fletcher et al. |
| 2008/0111816 | A1 | 5/2008 | Abraham et al. |
| 2008/0168527 | A1 | 7/2008 | Koved et al. |
| 2008/0210747 | A1 * | 9/2008 | Takashima .................... 235/375 |
| 2008/0215176 | A1 * | 9/2008 | Borovinskih et al. ......... 700/117 |
| 2008/0276791 | A1 | 11/2008 | Lemons |
| 2008/0306874 | A1 | 12/2008 | White |
| 2009/0137408 | A1 | 5/2009 | Jacobson |
| 2009/0157452 | A1 | 6/2009 | Arora et al. |
| 2009/0165147 | A1 | 6/2009 | Jung et al. |
| 2009/0222914 | A1 | 9/2009 | Ozawa |
| 2009/0238362 | A1 * | 9/2009 | Kitani et al. .................... 380/44 |

OTHER PUBLICATIONS

U.S. Appl. No. 12/079,921, Jung et al.
U.S. Appl. No. 12/287,704, Jung et al.
U.S. Appl. No. 12/287,719, Jung et al.
U.S. Appl. No. 12/288,336, Jung et al.
U.S. Appl. No. 12/290,001, Jung et al.
U.S. Appl. No. 12/321,365, Jung et al.
U.S. Appl. No. 12/321,385, Jung et al.
Dey, Anind K.; Abowd, Gregory D.; Salber, Daniel; "A Conceptual Framework and a Toolkit for Supporting the Rapid Prototyping of Context-Aware Applications"; Human-Computer Interaction; bearing a date of 2001; pp. 97-166 (print-out pp. 1-67); vol. 16; No. 2, 3 & 4.
Garfinkel, Tal; Pfaff, Ben; Chow, Jim; Rosenblum, Mendel; Boneh, Dan; "Terra: A Virtual Machine-Based Platform for Trusted Computing"; 196th Symposium on Operating System Principles (SOSP 2003); bearing a date of Oct. 19-22, 2003; pp. 1-14; Bolton Landing; New York; USA.
Garfinkel, Tal; Rosenblum, Mendel; Boneh, Dan; "Flexible OS Support and Applications for Trusted Computing"; Proceedings of HotOS IX: The 9th Workshop on Hot Topics in Operating Systems; bearing a date of May 18-21, 2003; total pp. 7; The USENIX Association.
Kraljic, Ivan C.; Quenot, Georges M.; Zavidovique, Bertrand; "A Methodology for Rapid Prototyping of Real-Time Image Processing VLSI Systems"; pp. 1-7; located at http://clips.imag.fr/mrim/georges.quenot/articles/rsp95.pdf.

\* cited by examiner

FIG. 3D configuring one or more manufacturing machines to operate as a function of the authorization status 330 enabling the one or more manufacturing machines to operate if the authorization status provides permission for operation wherein the one or more manufacturing machines perform one or more of rapid prototyping, three-dimensional printing, two-dimensional printing, freeform fabrication, solid freeform fabrication, and seriolithography 3302 enabling the one or more manufacturing machines to operate if the authorization status provides permission for operation wherein the one or more manufacturing machines include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine 3304 enabling the one or more manufacturing machines to operate if the authorization status provides permission for operation wherein the one or more manufacturing machines include one or more of an extrusion manufacturing machine, a melting manufacturing machine, a solidification manufacturing machine, an ejection manufacturing machine, a die casting manufacturing machine, a stamping process machine 3306

US 8,429,754 B2

CONTROL TECHNIQUE FOR OBJECT PRODUCTION RIGHTS

BACKGROUND

The present application relates generally to a control technique for object production rights.

SUMMARY

In one aspect, a method for a control technique for object production rights includes but is not limited to receiving at the duplication control system a digital rights management code, the digital rights management code associated with one or more object data files; generating an authorization status based on the digital rights management code; and configuring one or more manufacturing machines to operate as a function of the authorization status. In addition to the foregoing, other method aspects are described in the claims, drawings, and text forming a part of the present application.

In another aspect, a computer program product related to a control technique for object production rights includes but is not limited to a signal bearing medium bearing at least one of one or more instructions for receiving at the duplication control system a digital rights management code, the digital rights management code associated with one or more object data files; one or more instructions for generating an authorization status based on the digital rights management code; and one or more instructions for configuring one or more manufacturing machines to operate as a function of the authorization status. In addition to the foregoing, other computer program product aspects are described in the claims, drawings, and text forming a part of the present application.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one aspect, a duplication control system for manufacturing media system includes but is not limited to a processor; a data store coupled to the processor, the data store configured to contain authorization guideline data associated with one or more object data files describing an object for manufacture; and a memory coupled to the processor, the memory including a digital rights management module configured to generate an authorization status based on the authorization guideline data, the authorization status determinative of a functionality of the one or more manufacturing machines. In addition to the foregoing, other a control technique for object production rights system aspects are described in the claims, drawings, and text forming a part of the present application.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In the description that follows, the subject matter of the application will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer which reconfigures or otherwise alters the operation of the computer in a manner well understood by those skilled in the art. The data structures where data is maintained are physical locations of the memory that have particular properties defined by the format of the data. However, although the subject matter of the application is being described in the foregoing context, it is not meant to be limiting as those of skill in the art will appreciate that some of the acts and operations described hereinafter can also be implemented in hardware, software, and/or firmware and/or some combination thereof.

Figure 1:
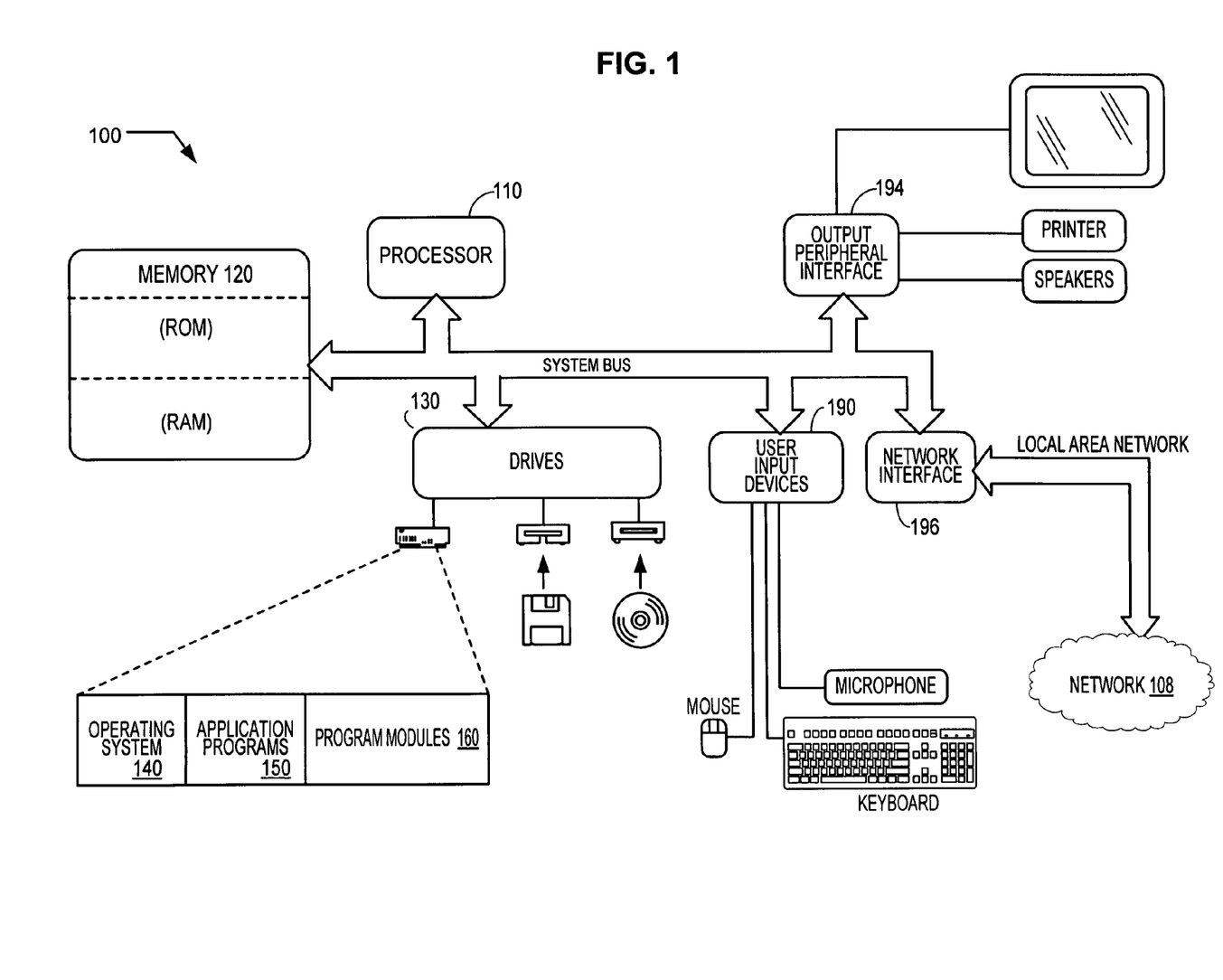
FIG. 1 is a block diagram of an exemplary computer architecture that supports the claimed subject matter of the present application.

With reference to FIG. 1, depicted is an exemplary computing system for implementing embodiments. FIG. 1 includes a computer 100, including a processor 110, memory 120 and one or more drives 130. The drives 130 and their associated computer storage media, provide storage of computer readable instructions, data structures, program modules and other data for the computer 100. Drives 130 can include an operating system 140, application programs 150, and program modules 160. Computer 100 further includes user input devices 190 through which a user may enter commands and data. Input devices can include an electronic digitizer, a microphone, a keyboard and pointing device, commonly referred to as a mouse, trackball or touch pad. Other input devices may include a joystick, game pad, satellite dish, scanner, or the like.

These and other input devices can be connected to processor 110 through a user input interface that is coupled to a system bus, but may be connected by other interface and bus structures, such as a parallel port, game port or a universal serial bus (USB). Computers such as computer 100 may also include other peripheral output devices such as speakers, which may be connected through an output peripheral interface 194 or the like.

Computer 100 may operate in a networked environment using logical connections to one or more computers, such as a remote computer connected to network interface 196 The remote computer may be a personal computer, a server, a router, a network PC, a peer device or other common network node, and can include many or all of the elements described above relative to computer 100. Networking environments are commonplace in offices, enterprise-wide area networks (WAN), local area networks (LAN), intranets and the Internet. For example, in the subject matter of the present application, computer 100 may comprise the source machine from which data is being migrated, and the remote computer may comprise the destination machine or vice versa. Note however, that source and destination machines need not be connected by a network 108 or any other means, but instead, data may be migrated via any media capable of being written by the source platform and read by the destination platform or platforms. When used in a LAN or WLAN networking environment, computer 100 is connected to the LAN through a network interface 196 or an adapter. When used in a WAN networking environment, computer 100 typically includes a modem or other means for establishing communications over the WAN, such as the Internet or network 108. It will be appreciated that other means of establishing a communications link between the computers may be used.

According to one embodiment, computer 100 is connected in a networking environment or a manufacturing machine either directly or via network 108 such that processor 110 and/or program modules 160 can perform a control technique for object production rights system capable of instantiating a digital rights management module in accordance with embodiments herein.

Figure 2:
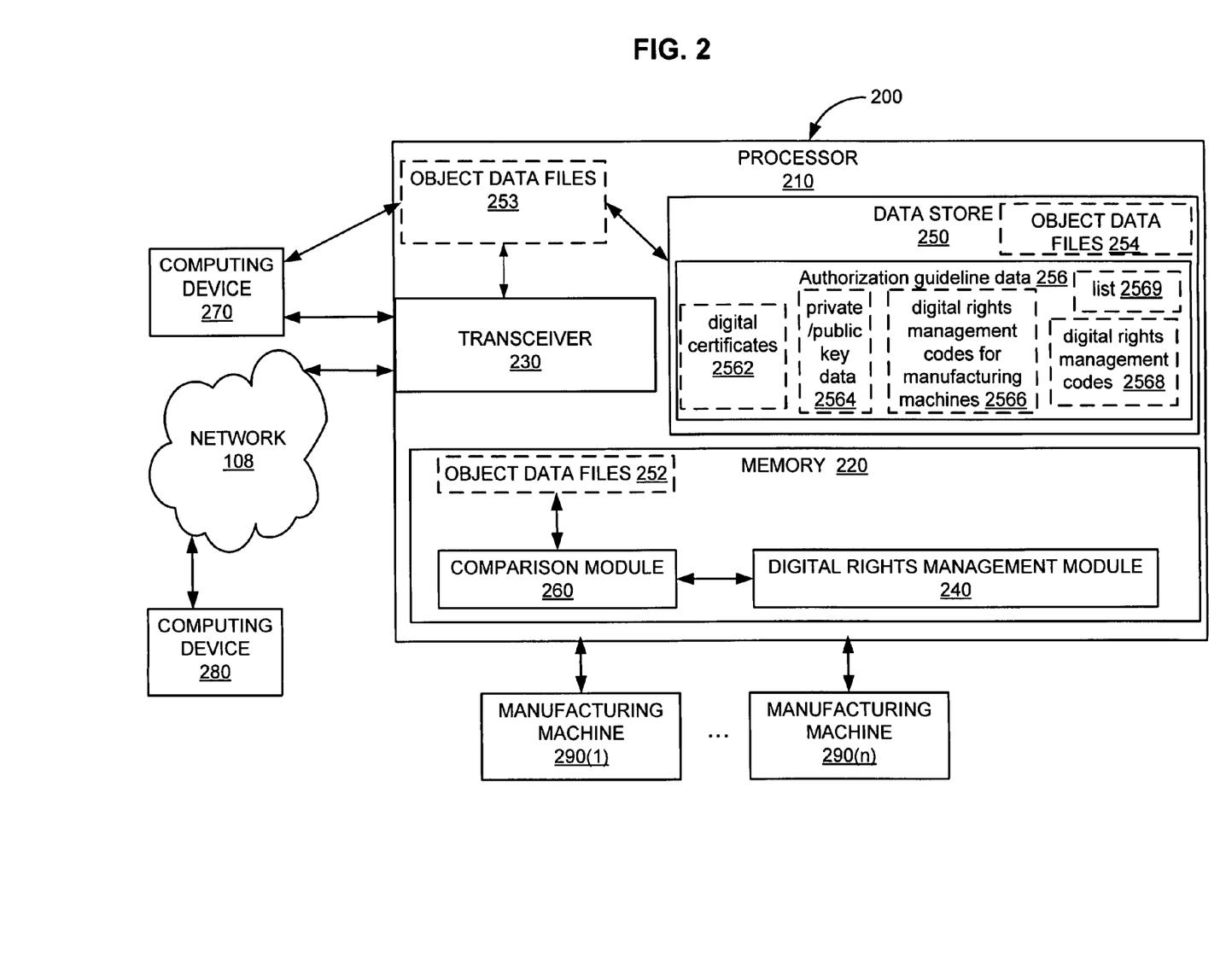
FIG. 2 is a block diagram of an exemplary system that supports the claimed subject matter of the present application.

Referring now to FIG. 2, illustrated is an exemplary block diagram for an embodiment of a duplication control system 200 for implementing a control technique for object production rights system. As shown, duplication control system 200 includes a processor 210, a memory 220, coupled to the processor 210. FIG. 2 also illustrates a transceiver 230 which can be configured to send and receive one or more object data files or directly interact with a computing device 270 for receiving object data files. FIG. 2 also illustrates digital rights management module 240 accessible by processor 210 and by network 108 (see FIG. 1). FIG. 2 further illustrates a data store 250 coupled to processor 210. Digital rights management module 240 is configured to control digital rights for object data files. In one embodiment, digital rights management module 240 is coupled to comparison module 260, which can also be disposed within memory 220. In one embodiment, comparison module 260 compares the digital rights management codes to a stored list of digital rights management codes to determine the authorization status as a function of the status of one or more previously compiled object data files. Comparison module 260 can further interact with object data files residing in memory 252, outside of memory 253, or in data store as object data files 254. In one embodiment, object data files 252, 253 and/or 254 include one or more computer-aided design (CAD) solid model files configured to create three dimensional physical objects.

Data store 250 is configured to include authorization guideline data 256. In one embodiment, the authorization guideline data can include one digital certificates 2562, private/public key data 2564, one or more digital rights management codes 2566 for manufacturing machines, and/or digital rights management codes 2568. In one embodiment, authorization guideline data includes list 2569 which can be a list of digital rights management codes, a list of object data files, or any list that could be, for example, associated with multiple manufacturing machines 290 that require multiple authorization rights to be analyzed or the like. In one embodiment, list 2569 includes globally unique identifiers (GUID) that can function as digital rights management codes and provide cryptographic control over the one or more object data files.

In the embodiment in which data store 250 includes object data files 254, the object data files can be files that previously existed in data store 250, or can be files that were previously received by the duplication control system 200 via transceiver 230, memory 220, network 108.

In one embodiment, data store 250 stores digital rights management codes separately from object data files, with the digital rights management codes decipherable with a public key, private key combination.

FIG. 2 further illustrates manufacturing machines 290(1-n) coupled to control system 200. The multiple manufacturing machines 290(1-n) can allow manufacture of an object described by the one or more object data files according to permissions provided in the one or more digital rights management codes.

In one embodiment, duplication control system 200 is coupled to each of the one or more manufacturing machines 290(1-n) to allow manufacture of an object described by the one or more object data files according to permissions provided in the one or more digital rights management codes.

In one embodiment, manufacturing machines 290(1-n) are three-dimensional additive manufacturing machines configured for rapid prototyping, three-dimensional printing, two-dimensional printing, freeform fabrication, solid freeform fabrication, and seriolithography.

In another embodiment, manufacturing machines 290(1-n) can include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine.

In another embodiment, manufacturing machines 290(1-n) can include an extrusion manufacturing machine, a melting manufacturing machine, a solidification manufacturing machine, an ejection manufacturing machine, a die casting manufacturing machine, a stamping process machine.

In another embodiment, manufacturing machines 290(1-n) can include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine.

In another embodiment, manufacturing machines 290(1-n) can include a manufacturing machine configured to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling.

In another embodiment, manufacturing machines 290(1-n) can include a manufacturing machine configured as two-dimensional manufacturing machines configured to perform manufacturing of one or more of skin, textiles, edible substances, paper and/or silicon printing.

It will be understood that the illustrated system embodiments of FIGS. 1-2 are provide by way of example only, and are not intended to be limiting. Furthermore, it will be understood that the various process features and system components disclosed herein may be incorporated in different embodiment combinations depending on the circumstances.

Referring now to FIGS. 3A, 3B, 3C and 3D an exemplary flow diagram illustrates the operation of a control technique for object production rights system according to one or more embodiments.

Figure 3A:
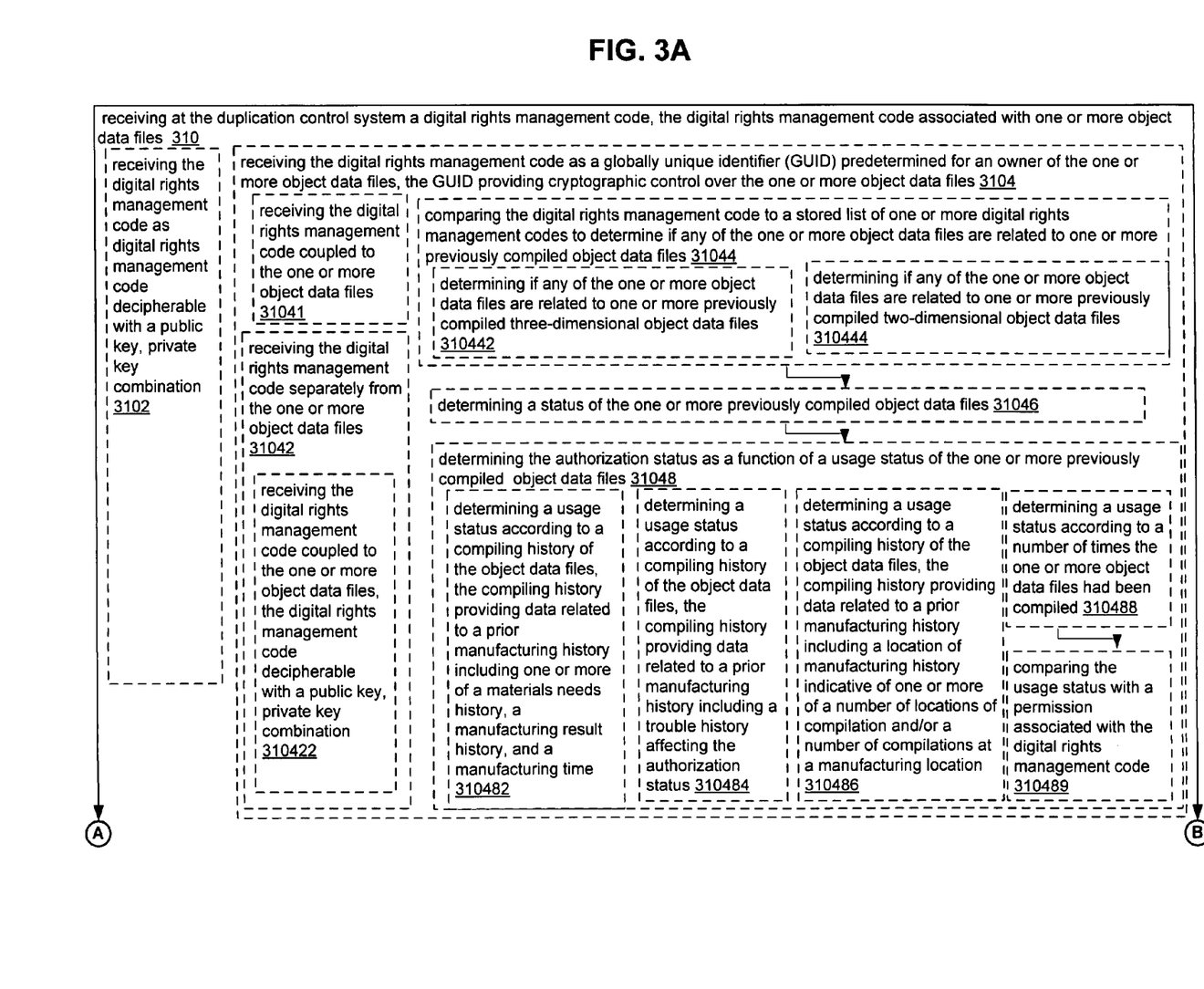
FIGS. 3A, 3B, 3C, and 3D illustrate a flow diagram of an exemplary method in accordance with an embodiment of the subject matter of the present application.

As illustrated in FIG. 3A, block 310 provides for receiving at the duplication control system a digital rights management code, the digital rights management code associated with one or more object data files (e.g., duplication control system 200 receiving digital rights management code associated with one or more object data file via computing deice 270, network 108, and/or manufacturing machine(s) 290(1-n)). Depicted within block 310 is optional block 3102, which provides for receiving the digital rights management code as digital rights management code decipherable with a public key, private key combination (e.g., a duplication control system 200 receiving one or more digital rights management code as cryptographically sealed code requiring a public key, private key pair).

Depicted within block 310 is optional block 3104, which provides for receiving the digital rights management code as a globally unique identifier (GUID) predetermined for an owner of the one or more object data files, the GUID providing cryptographic control over the one or more object data files (e.g., a duplication control system 200 receiving digital rights management code as a globally unique identifier (GUID) predetermined for an owner of the one or more object data files, the GUID providing cryptographic control from a manufacturing machine 290, and/or computer 100).

Depicted within block 3104 is optional block 31041 which provides for receiving the digital rights management code coupled to the one or more object data files (e.g., duplication control system 200 receiving digital rights management code coupled to one or more object data files).

Depicted within block 3104 is optional block 31042 which provides for receiving the digital rights management code separately from the one or more object data files (e.g., duplication control system 200 receiving digital rights management code in a separate transaction over transceiver 230).

Depicted within block 30142 is optional block 310422 which provides for receiving the digital rights management code coupled to the one or more object data files, the digital rights management code decipherable with a public key, private key combination (e.g., duplication control system 200 receiving digital rights management code over network 108, from computing device 270 and/or from manufacturing machine 290(1-n) wherein the digital rights management code is protected by a public key, private key pair). In one embodiment the digital rights management codes can be globally unique identifier (GUID) predetermined for an owner of the one or more object data files, the GUID providing cryptographic control over the one or more object data files. In other embodiments, the GUID can be associated with a public/private key pair.

Also depicted within block 3104 is optional block 31044, which provides for comparing the digital rights management code to a stored list of one or more digital rights management codes to determine if any of the one or more object data files are related to one or more previously compiled object data files (e.g., comparison module 260 performing comparisons of the digital management code with a stored list in data store 250 of digital rights management codes to determine if the object data files are related to one more previously compiled object data files, the object data files can be received via manufacturing machine 290(1-n), computing device 270 and/or computing device 280 over network 109). Optional block 31044 is coupled to optional block 31046 which provides for determining a status of the one or more previously compiled object data files (e.g., digital rights management module 240 determining a status of the previously compiled object data files).

Optional block 31046 is further coupled to optional block 31048 which provides for determining the authorization status as a function of a usage status of the one or more previously compiled object data files (e.g., digital rights management module 240 determining a status as a function of a usage status of the previously compiled object data files).

31048 includes optional block 310482 which provides for determining a usage status according to a compiling history of the object data files, the compiling history providing data related to a prior manufacturing history including one or more of a materials needs history, a manufacturing result history, and a manufacturing time (e.g., digital rights management module 240 determining a status of the previously compiled object data files received via network 108, computing device 270, manufacturing machines 290(1-n) and/or data store 250).

Block 31048 further depicts optional block 310484, which provides for determining a usage status according to a compiling history of the object data files, the compiling history providing data related to a prior manufacturing history including a trouble history affecting the authorization status (e.g., digital rights management module 240 determining a status of the previously compiled object data files compiling history and trouble history affecting an authorization status received via network 108, computing device 270, manufacturing machines 290(1-n) and/or data store 250).

Further depicted within block 31048 is optional block 310486 which provides for determining a usage status according to a compiling history of the object data files, the compiling history providing data related to a prior manufacturing history including a location of manufacturing history indicative of one or more of a number of locations of compilation and/or a number of compilations at a manufacturing location (e.g., digital rights management module 240 determining a number of locations of compilation and/or number of compilations of the previously compiled object data files received via network 108, computing device 270, manufacturing machines 290(1-n) and/or data store 250).

Optional block 31048 further depicts optional blocks 310488 and 310489. Optional block 310488 provides for determining a usage status according to a number of times the one or more object data files had been compiled (e.g., digital rights management module 240 determining a status of the previously compiled object data files received via network 108, computing device 270, manufacturing machines 290(1-n) and/or data store 250). Optional block 31049 provides for comparing the usage status with a permission associated with the digital rights management code (e.g., digital rights management module 240 determining a status of the previously compiled object data files received via network 108, computing device 270, manufacturing machines 290(1-n) and/or data store 250 and comparing via comparison module 260 a usage status with a permission associated with the digital rights management code).

Figure 3B:
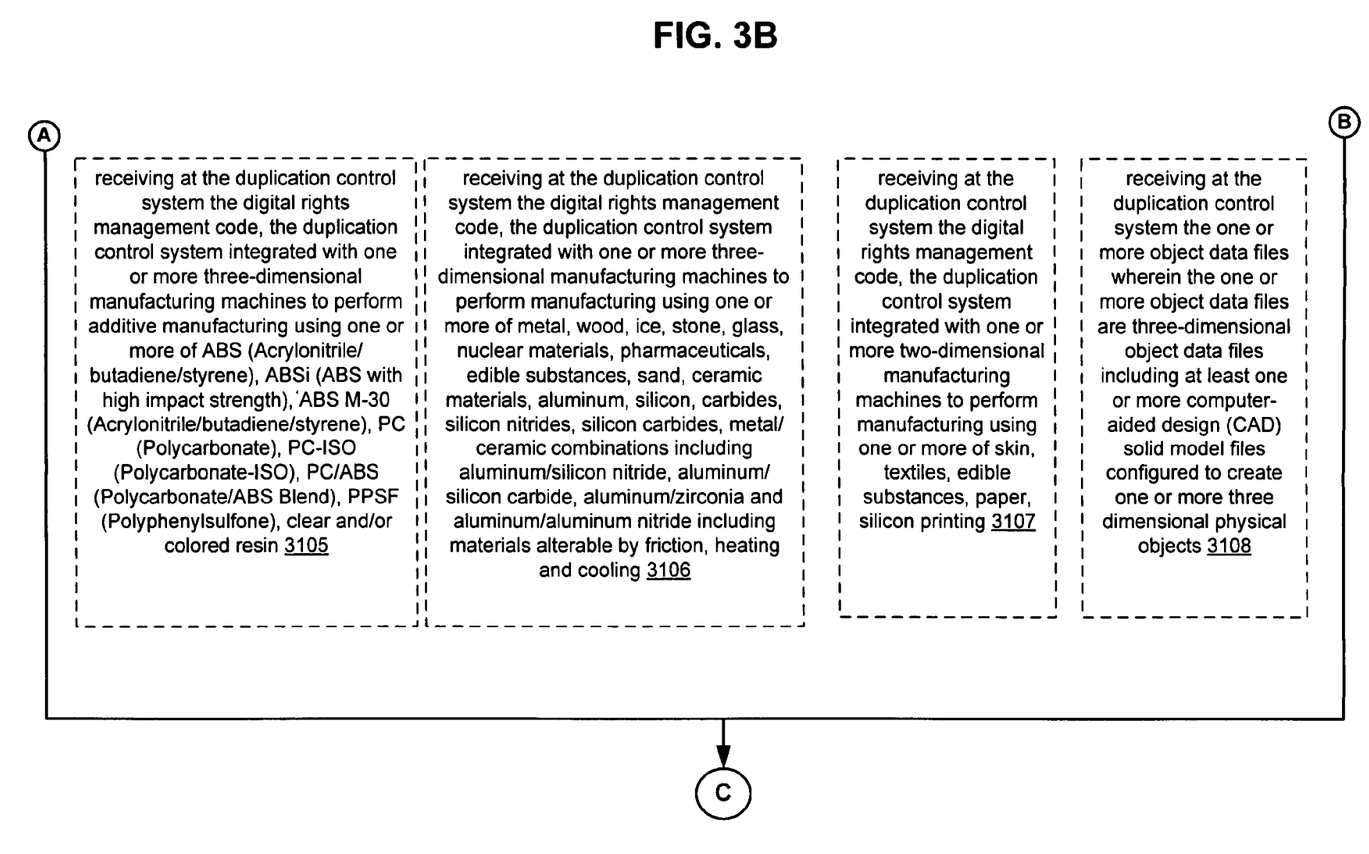

Referring now to FIG. 3B, the flow diagram depicting a method according to an embodiment continues. Specifically, block 310 further depicts optional block 3105, which provides for receiving at the duplication control system the digital rights management code, the duplication control system integrated with one or more three-dimensional manufacturing machines to perform additive manufacturing using one or more of ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin (e.g., duplication control system 200 receiving digital rights management code, wherein duplication control system 200 is integrated with one or more of manufacturing machines 290(1-n) that perform three-dimensional manufacturing to perform additive manufacturing).

Block 310 further depicts optional block 3106, which provides for receiving at the duplication control system the digital rights management code, the duplication control system integrated with one or more three-dimensional manufacturing machines to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling (e.g., duplication control system 200 receiving digital rights management code, wherein duplication control system 200 is integrated with one or more of manufacturing machines 290(1-n) that perform three-dimensional manufacturing to perform manufacturing of metal, wood, ice, stone, glass, nuclear materials, pharmaceuticals, edible substances, sand, ceramic materials, aluminum, silicon, carbides, silicon nitrides, silicon carbides, and/or metal/ceramic combinations).

Block 310 further depicts optional block 3107, which provides for receiving at the duplication control system the digital rights management code, the duplication control system integrated with one or more two-dimensional manufacturing machines to perform manufacturing using one or more of skin, textiles, edible substances, paper, silicon printing (e.g., duplication control system 200 receiving digital rights management code, wherein duplication control system 200 is integrated with one or more of manufacturing machines 290(1-n) to perform two-dimensional manufacturing).

Block 310 further depicts optional block 3108, which provides for receiving at the duplication control system the one or more object data files wherein the one or more object data files are three-dimensional object data files including at least one or more computer-aided design (CAD) solid model files configured to create one or more three dimensional physical objects (e.g., duplication control system 200 receiving digital rights management code, wherein duplication control system 200 is integrated with one or more of manufacturing machines 290(1-n) to perform three-dimensional manufacturing of CAD files).

Figure 3C:
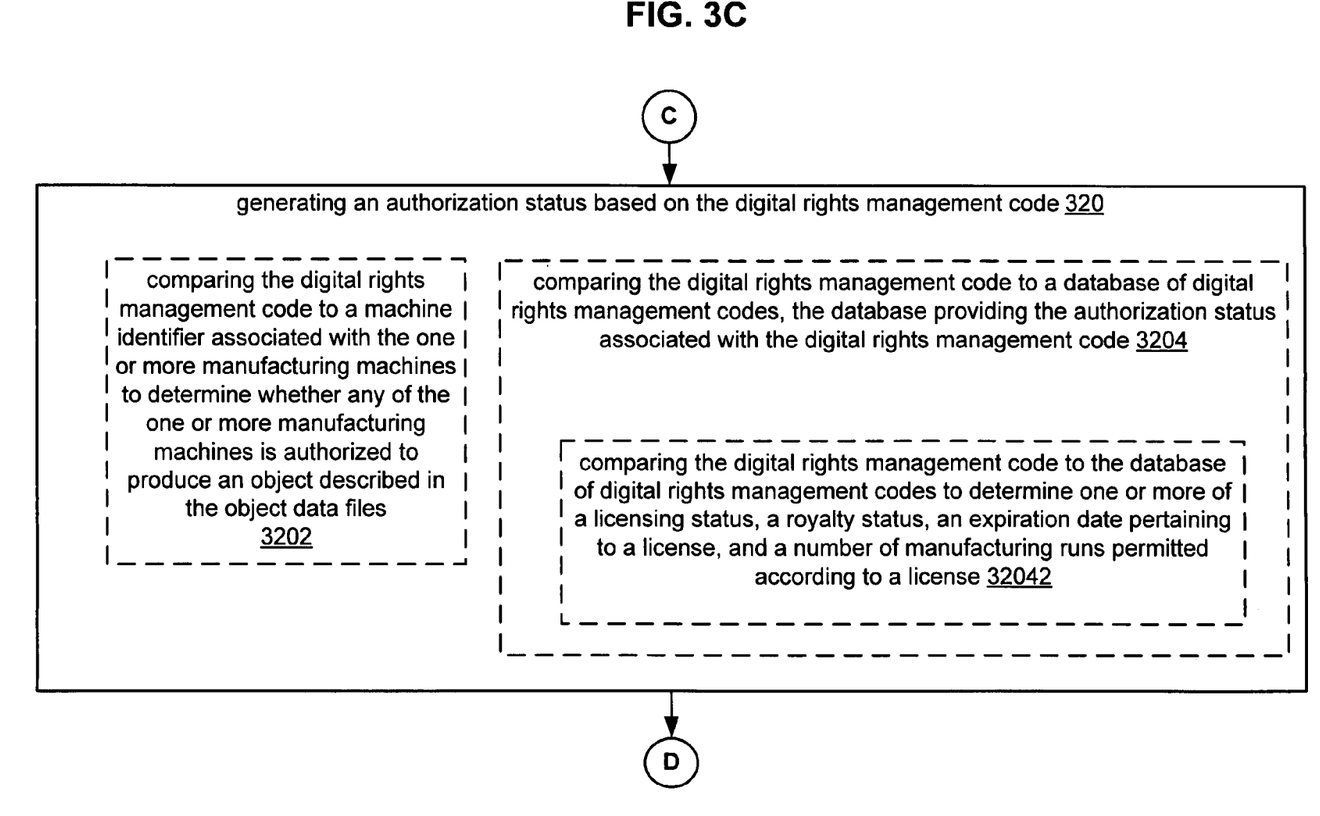

Referring now to FIG. 3C, the flow diagram depicting a method in accordance with an embodiment continues. Block 320 illustrates an aspect for generating an authorization status based on the digital rights management code (e.g., digital rights management module 240 generating the authorization status based on received or stored digital rights management code). Depicted within block 320 is optional block 3202 which provides for comparing the digital rights management code to a machine identifier associated with the one or more manufacturing machines to determine whether any of the one or more manufacturing machines is authorized to produce an object described in the object data files (e.g. comparison module 260 comparing the digital rights management code to a machine identifier supplied by one or more of manufacturing machines 290(1-n)).

Block 320 further depicts optional block 3204 which provides for comparing the digital rights management code to a database of digital rights management codes, the database providing the authorization status associated with the digital rights management code (e.g., comparison module 260 comparing the digital rights management code to a database in data store 250 storing digital rights management codes, including authorization status).

Depicted within optional block 3204 is optional block 32042 which provides for comparing the digital rights management code to the database of digital rights management codes to determine one or more of a licensing status, a royalty status, an expiration date pertaining to a license, and a number of manufacturing runs permitted according to a license (e.g., comparison module 260 comparing the digital rights management code to determine a licensing status, royalty status, expiration date, number of times a license permits a manufacturing run and the like).

Figure 3D:
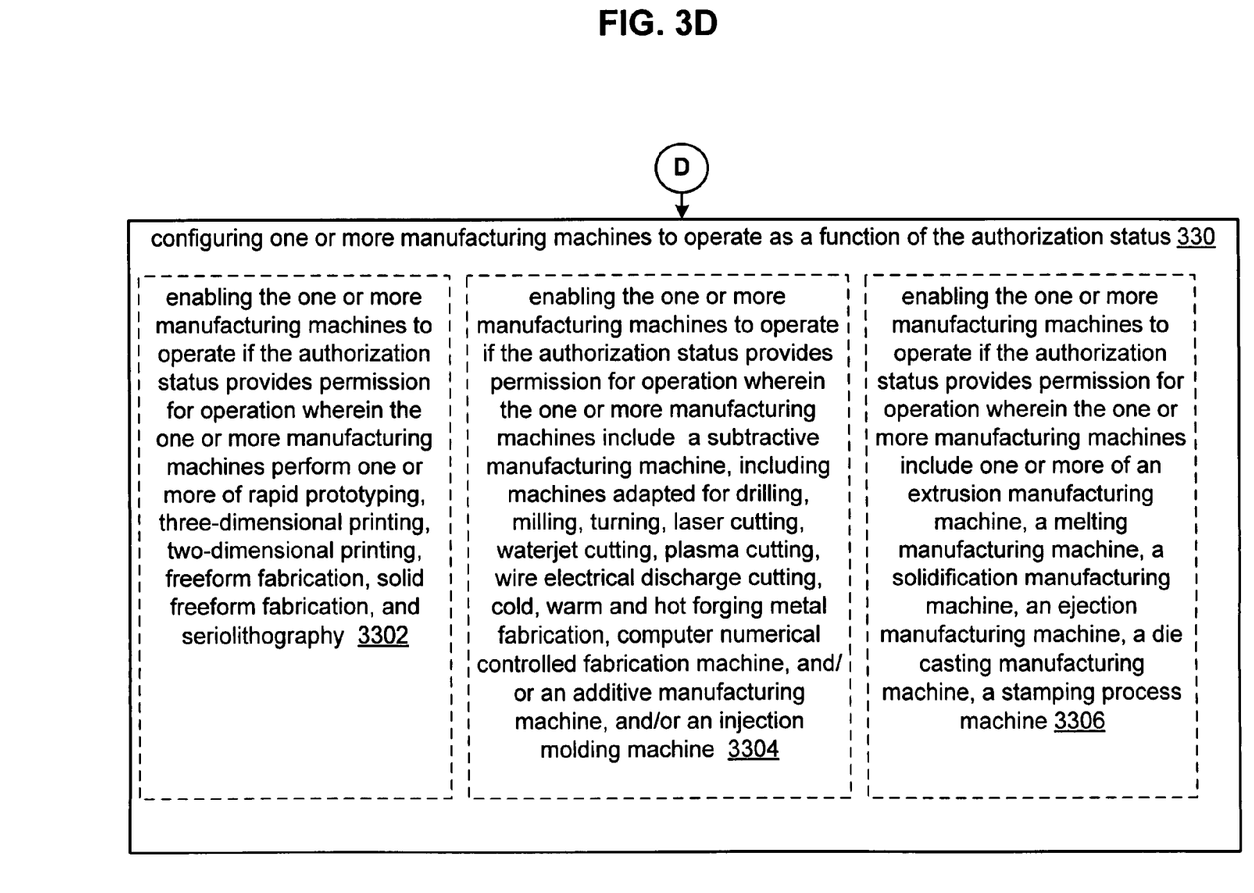

Referring now to FIG. 3D, the flow diagram continues illustrating the method in accordance with an embodiment with block 330. Specifically, block 330 illustrates an aspect for configuring one or more manufacturing machines to operate as a function of the authorization status (e.g., processor 210 and digital rights management module configuring one or more manufacturing machines 290(1-n) to operate in accordance with the authorization status determined by comparison module 260).

Depicted within block 330 is optional block 3302 which provides for enabling the one or more manufacturing machines to operate if the authorization status provides permission for operation wherein the one or more manufacturing machines perform one or more of rapid prototyping, three-dimensional printing, two-dimensional printing, freeform fabrication, solid freeform fabrication, and seriolithography (e.g., digital rights management module 240 interacting with one or more of manufacturing machines 290(1-n) to operate according the authorization status).

Also depicted within block 330 is optional block 3304 which provides for enabling the one or more manufacturing machines to operate if the authorization status provides permission for operation wherein the one or more manufacturing machines include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine (e.g., digital rights management module 240 interacting with the one or more manufacturing machines 290(1-n) to operate if the authorization status provides permission for operation, the one or more manufacturing machines 290(1-n) including subtractive manufacturing machines).

Further depicted within block 330 is optional block 3306 which provides for enabling the one or more manufacturing machines to operate if the authorization status provides permission for operation wherein the one or more manufacturing machines include one or more of an extrusion manufacturing machine, a melting manufacturing machine, a solidification manufacturing machine, an ejection manufacturing machine, a die casting manufacturing machine, a stamping process machine (e.g., digital rights management module 240 interacting with the one or more manufacturing machines 290(1-n) to operate if the authorization status provides permission for operation, the one or more manufacturing machines 290(1-n) can include an extrusion manufacturing machine, a melting manufacturing machine, a solidification manufacturing machine, an ejection manufacturing machine, a die casting manufacturing machine, a stamping process machine or the like).

Those with skill in the computing arts will recognize that the disclosed embodiments have relevance to a wide variety of applications and architectures in addition to those described above. In addition, the functionality of the subject matter of the present application can be implemented in software, hardware, or a combination of software and hardware. The hardware portion can be implemented using specialized logic; the software portion can be stored in a memory or recording medium and executed by a suitable instruction execution system such as a microprocessor.

While the subject matter of the application has been shown and described with reference to particular embodiments thereof, it will be understood by those skilled in the art that the foregoing and other changes in form and detail may be made therein without departing from the spirit and scope of the subject matter of the application, including but not limited to additional, less or modified elements and/or additional, less or modified blocks performed in the same or a different order.

Those having skill in the art will recognize that the state of the art has progressed to the point where there is little distinction left between hardware and software implementations of aspects of systems. The use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skilled in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.)

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, Specific examples of operably couplable include but are not limited to physically mateable and/or physically interacting components and/or wirelessly interactable and/or wirelessly interacting components and/or logically interacting and/or logically interactable components.

Those skilled in the art will recognize that it is common within the art to implement devices and/or processes and/or systems in the fashion(s) set forth herein, and thereafter use engineering and/or business practices to integrate such implemented devices and/or processes and/or systems into more comprehensive devices and/or processes and/or systems. That is, at least a portion of the devices and/or processes and/or systems described herein can be integrated into comprehensive devices and/or processes and/or systems via a reasonable amount of experimentation. Those having skill in the art will recognize that examples of such comprehensive devices and/or processes and/or systems might include, as appropriate to context and application, all or part of devices and/or processes and/or systems of (a) an air conveyance (e.g., an airplane, rocket, hovercraft, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Quest, Southwestern Bell, etc.); or (g) a wired/wireless services entity such as Sprint, Cingular, Nextel, etc.), etc.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skilled in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skills in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method for a duplication control system for manufacturing, the method comprising:
    receiving at a duplication control system a digital rights management code, the digital rights management code associated with one or more object data files, wherein the receiving at a duplication control system a digital rights management code, the digital rights management code associated with one or more object data files includes:
        receiving the digital rights management code as a globally unique identifier (GUID) predetermined for an owner of the one or more object data files, the GUID providing cryptographic control over the one or more object data files;
    generating an authorization status based on the digital rights management code; and
    configuring one or more manufacturing machines to operate as a function of the authorization status.

2. The method of claim 1 wherein the receiving at the duplication control system a digital rights management code, the digital rights management code associated with one or more object data files includes:
    receiving the digital rights management code as digital rights management code decipherable with a public key, private key combination.

3. The method of claim 1 wherein the receiving the digital rights management code as a globally unique identifier (GUID) predetermined for an owner of the one or more object data files, the GUID providing cryptographic control over the one or more object data files includes:
    receiving the digital rights management code coupled to the one or more object data files.

4. The method of claim 1 wherein the receiving the digital rights management code as a globally unique identifier (GUID) predetermined for an owner of the one or more object data files, the GUID providing cryptographic control over the one or more object data files includes:
    receiving the digital rights management code separately from the one or more object data files.

5. The method of claim 1 wherein the receiving at the duplication control system a digital rights management code, the digital rights management code associated with one or more object data files includes:
    receiving at the duplication control system the digital rights management code, the duplication control system integrated with one or more three-dimensional manufacturing machines to perform additive manufacturing using one or more of ABS (Acrylonitrile/butadiene/styrene), ABSi (ABS with high impact strength), ABS M-30 (Acrylonitrile/butadiene/styrene), PC (Polycarbonate), PC-ISO (Polycarbonate-ISO), PC/ABS (Polycarbonate/ABS Blend), PPSF (Polyphenylsulfone), clear and/or colored resin.

6. The method of claim 1 wherein the receiving at the duplication control system a digital rights management code, the digital rights management code associated with one or more object data files includes:
    receiving at the duplication control system the digital rights management code, the duplication control system integrated with one or more three-dimensional manufacturing machines to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling.

7. The method of claim 1 wherein the receiving at the duplication control system a digital rights management code, the digital rights management code associated with one or more object data files includes:
    receiving at the duplication control system the digital rights management code, the duplication control system integrated with one or more two-dimensional manufacturing machines to perform manufacturing using one or more of skin, textiles, edible substances, paper, silicon printing.

8. The method of claim 1 wherein the receiving at the duplication control system a digital rights management code, the digital rights management code associated with one or more object data files includes:

receiving at the duplication control system the one or more object data files wherein the one or more object data files are three-dimensional object data files including at least one or more computer-aided design (CAD) solid model files configured to create one or more three dimensional physical objects.

9. The method of claim 1 wherein the generating an authorization status based on the digital rights management code includes:
comparing the digital rights management code to a machine identifier associated with the one or more manufacturing machines to determine whether any of the one or more manufacturing machines is authorized to produce an object described in the object data files.

10. The method of claim 1 wherein the configuring one or more manufacturing machines to operate as a function of the authorization status includes:
enabling the one or more manufacturing machines to operate if the authorization status provides permission for operation wherein the one or more manufacturing machines perform one or more of rapid prototyping, three-dimensional printing, two-dimensional printing, freeform fabrication, solid freeform fabrication, and seriolithography.

11. The method of claim 1 wherein the configuring one or more manufacturing machines to operate as a function of the authorization status includes:
enabling the one or more manufacturing machines to operate if the authorization status provides permission for operation wherein the one or more manufacturing machines include at least one of a subtractive manufacturing machine, a drilling machine, a milling machine, a turning machine, a laser cutting machine, a waterjet cutting machine, a plasma cutting machine, a wire electrical discharge cutting machine, a cold forging metal fabrication machine, a warm forging metal fabrication machine, a hot forging metal fabrication, computer numerical controlled fabrication machine, an additive manufacturing machine and an injection molding machine.

12. The method of claim 1 wherein the configuring one or more manufacturing machines to operate as a function of the authorization status includes:
enabling the one or more manufacturing machines to operate if the authorization status provides permission for operation wherein the one or more manufacturing machines include one or more of an extrusion manufacturing machine, a melting manufacturing machine, a solidification manufacturing machine, an ejection manufacturing machine, a die casting manufacturing machine, a stamping process machine.

13. A method for a duplication control system for manufacturing, the method comprising:
receiving at a duplication control system a digital rights management code, the digital rights management code associated with one or more object data files, wherein the receiving at a duplication control system a digital rights management code, the digital rights management code associated with one or more object data files includes:
comparing the digital rights management code to a stored list of one or more digital rights management codes to determine if any of the one or more object data files are related to one or more previously compiled object data files; and
determining a status of the one or more previously compiled object data files;

generating an authorization status based on the digital rights management code; and
configuring one or more manufacturing machines to operate as a function of the authorization status.

14. The method of claim 13 wherein the comparing the digital rights management code to a stored list of one or more digital rights management codes to determine if any of the one or more object data files are related to one or more previously compiled object data files includes:
determining if any of the one or more object data files are related to one or more previously compiled three-dimensional object data files.

15. The method of claim 13 wherein the comparing the digital rights management code to a stored list of one or more digital rights management codes to determine if any of the one or more object data files are related to one or more previously compiled object data files includes:
determining if any of the one or more object data files are related to one or more previously compiled two-dimensional object data files.

16. The method of claim 13, further comprising:
determining the authorization status as a function of a usage status of the one or more previously compiled object data files.

17. The method of claim 16 wherein the determining the authorization status as a function of a usage status of the one or more previously compiled object data files includes:
determining a usage status according to a compiling history of the object data files, the compiling history providing data related to a prior manufacturing history including one or more of a materials needs history, a manufacturing result history, and a manufacturing time.

18. The method of claim 16 wherein the determining the authorization status as a function of a usage status of the one or more previously compiled object data files includes:
determining a usage status according to a compiling history of the object data files, the compiling history providing data related to a prior manufacturing history including a trouble history affecting the authorization status.

19. The method of claim 16 wherein the determining the authorization status as a function of a usage status of the one or more previously compiled object data files includes:
determining a usage status according to a compiling history of the object data files, the compiling history providing data related to a prior manufacturing history including a location of manufacturing history indicative of one or more of a number of locations of compilation and/or a number of compilations at a manufacturing location.

20. The method of claim 16 wherein the determining the authorization status as a function of a usage status of the one or more previously compiled object data files includes:
determining a usage status according to a number of times the one or more object data files had been compiled; and
comparing the usage status with a permission associated with the digital rights management code.

21. A method for a duplication control system for manufacturing, the method comprising:
receiving at a duplication control system a digital rights management code, the digital rights management code associated with one or more object data files;
generating an authorization status based on the digital rights management code, wherein the generating an authorization status based on the digital rights management code includes:

comparing the digital rights management code to a database of digital rights management codes, the database providing the authorization status associated with the digital rights management code; and configuring one or more manufacturing machines to operate as a function of the authorization status.

22. The method of claim 21 wherein the comparing the digital rights management code to a database of digital rights management codes, the database providing the authorization status associated with the digital rights management code includes:

comparing the digital rights management code to the database of digital rights management codes to determine one or more of a licensing status, a royalty status, an expiration date pertaining to a license, and a number of manufacturing runs permitted according to a license.

23. A computer program product comprising a computer readable medium configured to perform one or more acts for performing secure manufacturing, the one or more acts comprising:

one or more instructions for receiving at a duplication control system a digital rights management code, the digital rights management code associated with one or more object data files, wherein the one or more instructions for receiving at a duplication control system a digital rights management code, the digital rights management code associated with one or more object data files includes:

one or more instructions for receiving the digital rights management code as a globally unique identifier (GUID) predetermined for an owner of the one or more object data files, the GUID providing cryptographic control over the one or more object data files;

one or more instructions for generating an authorization status based on the digital rights management code; and one or more instructions for configuring one or more manufacturing machines to operate as a function of the authorization status.

24. The computer program product of claim 23 wherein the one or more instructions for receiving at the duplication control system a digital rights management code, the digital rights management code associated with one or more object data files includes:

one or more instructions for receiving the digital rights management code as digital rights management code decipherable with a public key, private key combination.

25. The computer program product of claim 23 wherein the one or more instructions for receiving the digital rights management code as a globally unique identifier (GUID) predetermined for an owner of the one or more object data files, the GUID providing cryptographic control over the one or more object data files includes:

one or more instructions for receiving the digital rights management code coupled to the one or more object data files.

26. The computer program product of claim 23 wherein the one or more instructions for receiving the digital rights management code as a globally unique identifier (GUID) predetermined for an owner of the one or more object data files, the GUID providing cryptographic control over the one or more object data files includes:

one or more instructions for receiving the digital rights management code separately from the one or more object data files.

27. The computer program product of claim 23 wherein the one or more instructions for receiving at the duplication control system a digital rights management code, the digital rights management code associated with one or more object data files includes:

one or more instructions for receiving at the duplication control system the digital rights management code, the duplication control system integrated with one or more three-dimensional manufacturing machines to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling.

28. The computer program product of claim 23 wherein the one or more instructions for receiving at the duplication control system a digital rights management code, the digital rights management code associated with one or more object data files includes:

one or more instructions for receiving at the duplication control system the digital rights management code, the duplication control system integrated with one or more two-dimensional manufacturing machines to perform manufacturing using one or more of skin, textiles, edible substances, paper, silicon printing.

29. The computer program product of claim 23 wherein the one or more instructions for receiving at the duplication control system a digital rights management code, the digital rights management code associated with one or more object data files includes:

one or more instructions for receiving at the duplication control system the one or more object data files wherein the one or more object data files are three-dimensional object data files including at least one or more computer-aided design (CAD) solid model files configured to create one or more three dimensional physical objects.

30. The computer program product of claim 23 wherein the one or more instructions for generating an authorization status based on the digital rights management code includes:

one or more instructions for comparing the digital rights management code to a machine identifier associated with the one or more manufacturing machines to determine whether any of the one or more manufacturing machines is authorized to produce an object described in the object data files.

31. The computer program product of claim 23 wherein the one or more instructions for configuring one or more manufacturing machines to operate as a function of the authorization status includes:

one or more instructions for enabling the one or more manufacturing machines to operate if the authorization status provides permission for operation wherein the one or more manufacturing machines perform one or more of rapid prototyping, three-dimensional printing, two-dimensional printing, freeform fabrication, solid freeform fabrication, and seriolithography.

32. The computer program product of claim 23 wherein the one or more instructions for configuring one or more manufacturing machines to operate as a function of the authorization status includes:

one or more instructions for enabling the one or more manufacturing machines to operate if the authorization status provides permission for operation wherein the one or more manufacturing machines include at least one of a subtractive manufacturing machine, a drilling machine, a milling machine, a turning machine, a laser cutting machine, a waterjet cutting machine, a plasma cutting machine, a wire electrical discharge cutting machine, a cold forging metal fabrication machine, a warm forging metal fabrication machine, a hot forging metal fabrication, computer numerical controlled fabrication machine, an additive manufacturing machine and an injection molding machine.

33. The computer program product of claim 23 wherein the one or more instructions for configuring one or more manufacturing machines to operate as a function of the authorization status includes:
one or more instructions for enabling the one or more manufacturing machines to operate if the authorization status provides permission for operation wherein the one or more manufacturing machines include one or more of an extrusion manufacturing machine, a melting manufacturing machine, a solidification manufacturing machine, an ejection manufacturing machine, a die casting manufacturing machine, a stamping process machine.

34. A computer program product comprising a computer readable medium configured to perform one or more acts for performing secure additive manufacturing, the one or more acts comprising:
one or more instructions for receiving at a duplication control system a digital rights management code, the digital rights management code associated with one or more object data files, wherein the one or more instructions for receiving at a duplication control system a digital rights management code, the digital rights management code associated with one or more object data files include:
one or more instructions for comparing the digital rights management code to a stored list of one or more digital rights management codes to determine if any of the one or more object data files are related to one or more previously compiled object data files; and
one or more instructions for determining a status of the one or more previously compiled object data files;
one or more instructions for generating an authorization status based on the digital rights management code; and
one or more instructions for configuring one or more manufacturing machines to operate as a function of the authorization status.

35. The computer program product of claim 34 further comprising:
one or more instructions for determining the authorization status as a function of a usage status of the one or more previously compiled object data files.

36. The computer program product of claim 35 wherein the one or more instructions for determining the authorization status as a function of a usage status of the one or more previously compiled object data files includes:
one or more instructions for determining a usage status according to a compiling history of the object data files, the compiling history providing data related to a prior manufacturing history including one or more of a materials needs history, a manufacturing result history, and a manufacturing time.

37. The computer program product of claim 35 wherein the one or more instructions for determining the authorization status as a function of a usage status of the one or more previously compiled object data files includes:
one or more instructions for determining a usage status according to a compiling history of the object data files, the compiling history providing data related to a prior manufacturing history including a trouble history affecting the authorization status.

38. The computer program product of claim 35 wherein the one or more instructions for determining the authorization status as a function of a usage status of the one or more previously compiled object data files includes:
one or more instructions for determining a usage status according to a compiling history of the object data files, the compiling history providing data related to a prior manufacturing history including a location of manufacturing history indicative of one or more of a number of locations of compilation and/or a number of compilations at a manufacturing location.

39. The computer program product of claim 35 wherein the one or more instructions for determining the authorization status as a function of a usage status of the one or more previously compiled object data files includes:
one or more instructions for determining a usage status according to a number of times the one or more object data files had been compiled; and
one or more instructions for comparing the usage status with a permission associated with the digital rights management code.

40. A computer program product comprising a computer readable medium configured to perform one or more acts for performing secure additive manufacturing, the one or more acts comprising:
one or more instructions for receiving at a duplication control system a digital rights management code, the digital rights management code associated with one or more object data files;
one or more instructions for generating an authorization status based on the digital rights management code, wherein the one or more instructions for generating an authorization status based on the digital rights management code includes:
one or more instructions for comparing the digital rights management code to a database of digital rights management codes, the database providing the authorization status associated with the digital rights management code; and
one or more instructions for configuring one or more manufacturing machines to operate as a function of the authorization status.

41. The computer program product of claim 40 wherein the one or more instructions comparing the digital rights management code to a database of digital rights management codes, the database providing the authorization status associated with the digital rights management code includes:
one or more instructions for comparing the digital rights management code to the database of digital rights management codes to determine one or more of a licensing status, a royalty status, an expiration date pertaining to a license, and a number of manufacturing runs permitted according to a license.

42. A duplication control system for manufacturing comprising:
a processor;
a data store operably coupled to the processor, the data store configured to contain authorization guideline data associated with one or more object data files describing an object for manufacture, wherein the authorization guideline data includes a globally unique identifier (GUID) predetermined for an owner of the one or more object data files, the GUID providing cryptographic control over the one or more object data files; and a memory operably coupled to the processor, the memory including:
a digital rights management module configured to generate an authorization status based on the authorization guideline data, the authorization status determinative of a functionality of one or more manufacturing machines.

43. The duplication control system for manufacturing of claim 42 wherein the authorization guideline data includes one or more of digital certificates, private/public key data, one or more digital rights management codes for one or more manufacturing machines, and the one or more digital rights management codes.

44. The duplication control system for manufacturing of claim 42 wherein the authorization guideline data includes a list of digital rights management codes, a list of object data files, a list of data associated with a plurality of manufacturing machines and/or a list of globally unique identifiers (GUIDs).

45. The duplication control system for manufacturing of claim 44 wherein the list of globally unique identifiers (GUIDs) includes one or more GUIDs that can function as one or more digital rights management codes and provide cryptographic control over the one or more object data files.

46. The duplication control system for manufacturing of claim 42 further comprising:
a transceiver coupled to the processor, the transceiver adapted to send and receive the authorization status to the one or more manufacturing machines.

47. The duplication control system for manufacturing of claim 42 further comprising:
one or more manufacturing machines coupled to the duplication control system, the duplication control system operably coupled to each of the one or more manufacturing machines to allow manufacture of an object described by the one or more object data files according to permissions provided in the one or more digital rights management codes.

48. The duplication control system for manufacturing of claim 42 wherein the data store coupled to the processor stores the one or more digital rights management codes separately from the one or more three-dimensional object data files, the one or more digital rights management codes decipherable with a public key, private key combination.

49. The duplication control system for manufacturing of claim 42 wherein the one or more object data files include one or more computer-aided design (CAD) solid model files configured to create one or more three dimensional physical objects.

50. The duplication control system for manufacturing of claim 42 wherein the one or more manufacturing machines are three-dimensional additive manufacturing machines configured for rapid prototyping, three-dimensional printing, two-dimensional printing, freeform fabrication, solid freeform fabrication, and seriolithography.

51. The duplication control system for manufacturing of claim 42 wherein the one or more manufacturing machines include a subtractive manufacturing machine, including machines adapted for drilling, milling, turning, laser cutting, waterjet cutting, plasma cutting, wire electrical discharge cutting, cold, warm and hot forging metal fabrication, computer numerical controlled fabrication machine, and/or an additive manufacturing machine, and/or an injection molding machine.

52. The duplication control system for manufacturing of claim 42 wherein the one or more manufacturing machines include a one or more of an extrusion manufacturing machine, a melting manufacturing machine, a solidification manufacturing machine, an ejection manufacturing machine, a die casting manufacturing machine, a stamping process machine.

53. The duplication control system for manufacturing of claim 42 wherein the one or more manufacturing machines include a one or more of a subtractive manufacturing machine, a drilling machine, a milling machine, a turning machine, a laser cutting machine, a waterjet cutting machine, a plasma cutting machine, a wire electrical discharge cutting machine, a cold forging metal fabrication machine, a warm forging metal fabrication machine, a hot forging metal fabrication, computer numerical controlled fabrication machine, an additive manufacturing machine and an injection molding machine.

54. The duplication control system for manufacturing of claim 42 wherein the one or more manufacturing machines include a one or more of an extrusion manufacturing machine, a melting manufacturing machine, a solidification manufacturing machine, an ejection manufacturing machine, a die casting manufacturing machine, a stamping process machine.

55. The duplication control system for manufacturing of claim 42 wherein the one or more manufacturing machines include a one or more a manufacturing machine configured to perform manufacturing using one or more of metal, wood, ice, stone, glass, nuclear materials, pharmaceuticals, edible substances, sand, ceramic materials, aluminum, silicon, carbides, silicon nitrides, silicon carbides, metal/ceramic combinations including aluminum/silicon nitride, aluminum/silicon carbide, aluminum/zirconia and aluminum/aluminum nitride including materials alterable by friction, heating and cooling.

56. The duplication control system for manufacturing of claim 42 wherein the one or more manufacturing machines are two-dimensional manufacturing machines configured to perform manufacturing of one or more of skin, textiles, edible substances, paper and silicon printing.

57. A duplication control system for manufacturing comprising:
a processor;
a data store operably coupled to the processor, the data store configured to contain authorization guideline data associated with one or more object data files describing an object for manufacture;
a memory operably coupled to the processor, the memory including:
a digital rights management module configured to generate an authorization status based on the authorization guideline data, the authorization status determinative of a functionality of one or more manufacturing machines; and
a comparison module operably coupled to the processor, the comparison module configured to compare the one or more digital rights management codes to stored authorization guideline data to determine the authorization status as a function of the status of one or more previously compiled object data files.

* * * * *